United States Patent
Shin (10) Patent No.: US 7,307,969 B2
(45) Date of Patent: Dec. 11, 2007

(54) METHOD AND SYSTEM FOR MAKING HANDOFF BETWEEN CDMA MOBILE COMMUNICATION SYSTEM

(75) Inventor: Yeong Jong Shin, Kunpo-shi (KR)

(73) Assignee: LG Electronics, Inc., Seoul (KR)

( * ) Notice: Subject to any disclaimer, the term of this patent is extended or adjusted under 35 U.S.C. 154(b) by 822 days.

(21) Appl. No.: 09/964,537

(22) Filed: Sep. 28, 2001

(65) Prior Publication Data
US 2002/0051432 A1    May 2, 2002

(30) Foreign Application Priority Data
Oct. 31, 2000    (KR) .......................... 10-2000-64302

(51) Int. Cl.
*H04B 7/216*    (2006.01)
*H04Q 7/00*    (2006.01)

(52) U.S. Cl. ...................... 370/331; 370/335; 370/342; 455/436

(58) Field of Classification Search ................ 370/331, 370/335, 336, 342, 347; 455/436–444, 448
See application file for complete search history.

(56) References Cited

U.S. PATENT DOCUMENTS

| | | | |
|---|---|---|---|
| 6,038,448 A * | 3/2000 | Chheda et al. | 455/436 |
| 6,069,871 A * | 5/2000 | Sharma et al. | 370/209 |
| 6,111,864 A * | 8/2000 | Kabasawa | 370/332 |
| 6,154,653 A * | 11/2000 | Jung | 455/442 |
| 6,532,221 B1 * | 3/2003 | Kim et al. | 370/332 |
| 6,618,432 B1 * | 9/2003 | Ganesh | 375/147 |
| 6,768,908 B1 * | 7/2004 | Jalloul et al. | 455/442 |
| 6,792,276 B1 * | 9/2004 | Butovitsch et al. | 455/453 |
| 6,804,519 B1 * | 10/2004 | Czaja et al. | 455/442 |

FOREIGN PATENT DOCUMENTS

| | | |
|---|---|---|
| CN | 1260648 A | 7/2000 |
| JP | 2000-511380 | 8/2000 |

OTHER PUBLICATIONS

JP Office Action w/ English translation.
Chinese Office Action dated Sep. 7, 2007, and its English translation.

* cited by examiner

*Primary Examiner*—Chi Pham
*Assistant Examiner*—Soon D. Hyun
(74) *Attorney, Agent, or Firm*—Ked & Associates, LLP

(57) ABSTRACT

A method and system for performing a handoff between different CDMA systems in a mobile communication network having first and second cells and a gateway cell is disclosed. The handoff between the first and second cells is performed using a gateway, wherein one frequency is used by the first cell and a first sector of the gateway, and a second frequency is used by the second cell and a second sector of the gateway. The system and method allow for performing a handoff of a call between two different communication systems having two different communication standards, such as between a CDMA 2G system and a CDMA 3G system, and further allows for the handoff to be performed without dropping the call.

27 Claims, 4 Drawing Sheets

METHOD AND SYSTEM FOR MAKING HANDOFF BETWEEN CDMA MOBILE COMMUNICATION SYSTEM

BACKGROUND OF THE INVENTION

1. Field of the Invention

The present invention relates to a mobile communication system, and more particularly to method and system for performing a handoff between different communication systems.

2. Background of the Related Art

A CDMA mobile communication system typically includes mobile stations that are capable of moving around unspecified regions and base stations for receiving/transmitting messages from/to the mobile stations, as well as managing radio resources. A control station is provided for controlling the base stations and the reception/transmission of messages from/to the base stations, and a switching center provides connections to the control station, switching centers of other communication systems, or other communication networks, for communication between mobile stations or between the mobile station and a fixed station. An important feature of the mobile communication system is the assurance of mobility of the subscriber's mobile station to provide such mobility, the handoff technology is required.

A handoff is a method of switching a communication path between the mobile station and a base station so that communication is continuous when the mobile station goes out of the coverage area of a first base station and into the coverage area of a second base station. A handoff is also used when the mobile station moves beyond a service region of a sector.

There are typically three (3) types of handoffs: a soft handoff, a softer handoff, and a hard handoff. The softer handoff occurs when the mobile station moves between sectors of a single base station. In this type of handoff, a frequency and a frame offset are maintained, and the mobile station sets up a new communication channel with a destination sector while the present communication channel between the mobile station and the base station is maintained. Thus, a voice packet is transmitted on many channels. The initial communication channel is subsequently cut off when the mobile station has sufficiently moved into the destination sector such that maintenance of the initial communication channel is not required anymore.

The soft handoff occurs when the mobile station moves between adjacent base stations while a frequency and a frame offset are maintained. In this handoff, the mobile station sets up a communication channel with a destination base station while maintaining the intial communication channel with the first base station. A voice packet is thus transmitted on many channels. The initial communication channel is subsequently cut off when the mobile station has sufficiently moved into the destination cell such that maintenance of the initial communication channel is no longer required.

The hard handoff is used when the mobile station moves to an adjacent base station and the frame offset is changed or the frequency is changed. Additionally, the hard handoff is used when the mobile station moves to another switching center. Unlike the soft handoff and the softer handoff, the mobile station cannot maintain the initial communication channel. Rather, a newly set up communication channel is used to transmit the voice packet.

The soft and softer handoff in which both base stations use the same frequency proceed smoothly and without call cutting because there is no ping-pong effect that is typical with a hard handoff. The soft or softer handoff, however, cannot be used when a handoff is between different systems or between 2G~3G systems having different frequencies, because the ping-pong effect caused by the handoff between the different frequencies leads to a very high call cut-off ratio.

In order to process the handoff between different CDMA systems or between 2G~3G systems, each of the base stations of the systems must have a pilot beacon for providing information on a handoff starting time point to the base stations and the mobile station, respectively. That is, when a mobile station moves from a cell 'A' to a cell 'B', the cell 'B' pilot beacon transmits a pilot signal having a frequency used in cell 'A' at a strength identical to a signal strength at a boundary of cell 'B' for handoff switching time point from cell 'A' to cell 'B'. Similarly, the cell 'A' pilot beacon transmits a pilot signal having a frequency used in cell 'B' at a strength identical to a signal strength at a boundary of cell 'A' for handoff switching time point from cell 'B' to cell 'A'. However, in an overlap area between cell 'A' and cell 'B', the call is cut off due to the ping-pong of the handoff.

Figure 1:
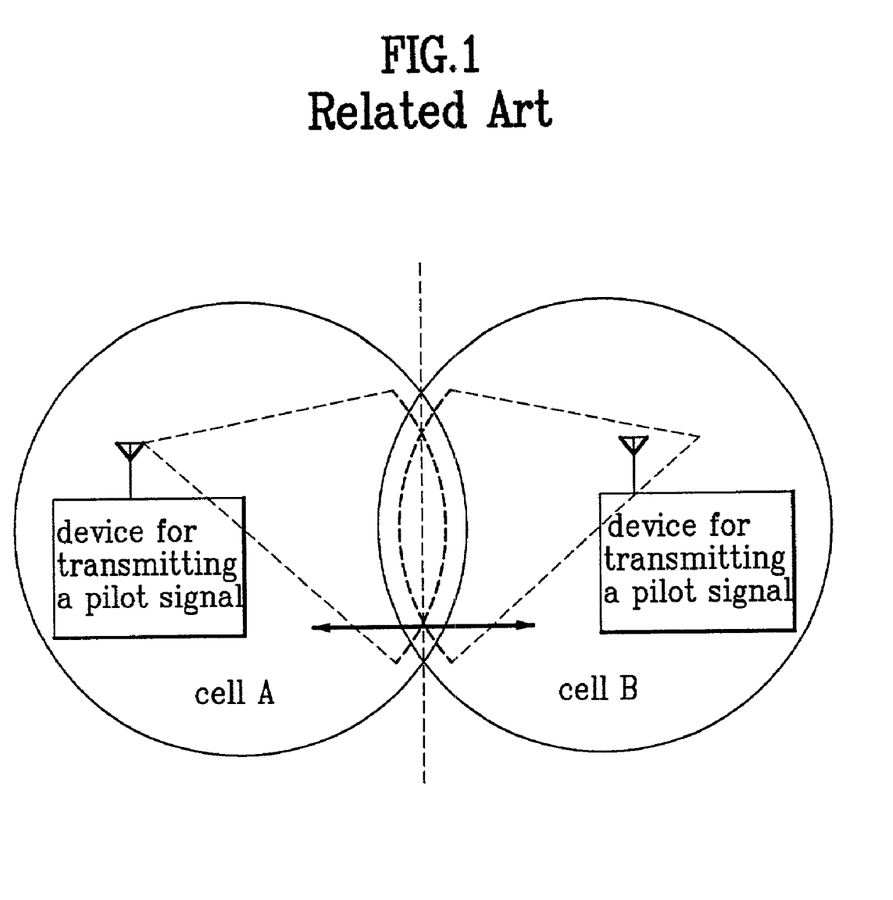
FIG. 1 illustrates a cell system of a related art handoff between CDMA mobile communication systems.

FIG. 1 illustrates a region between cells in a related art CDMA mobile communication system. Referring to FIG. 1, when the mobile station moves from cell 'A' to cell 'B', the cell 'B' pilot beacon transmits a pilot signal having a frequency used in cell 'A' at a strength equal to a signal strength at a boundary of cell 'B'. The pilot beacon is transmitted to give the mobile station information on a handoff starting time point, for handing-off from cell 'A' to cell 'B'. When the mobile station moves from a cell 'B' to a cell 'A', the cell 'A' pilot beacon transmits a pilot signal having a frequency used in cell 'B' at a strength equal to a signal strength at a boundary of cell 'A' for handing-off from cell 'B' to cell 'A'.

Figure 2:
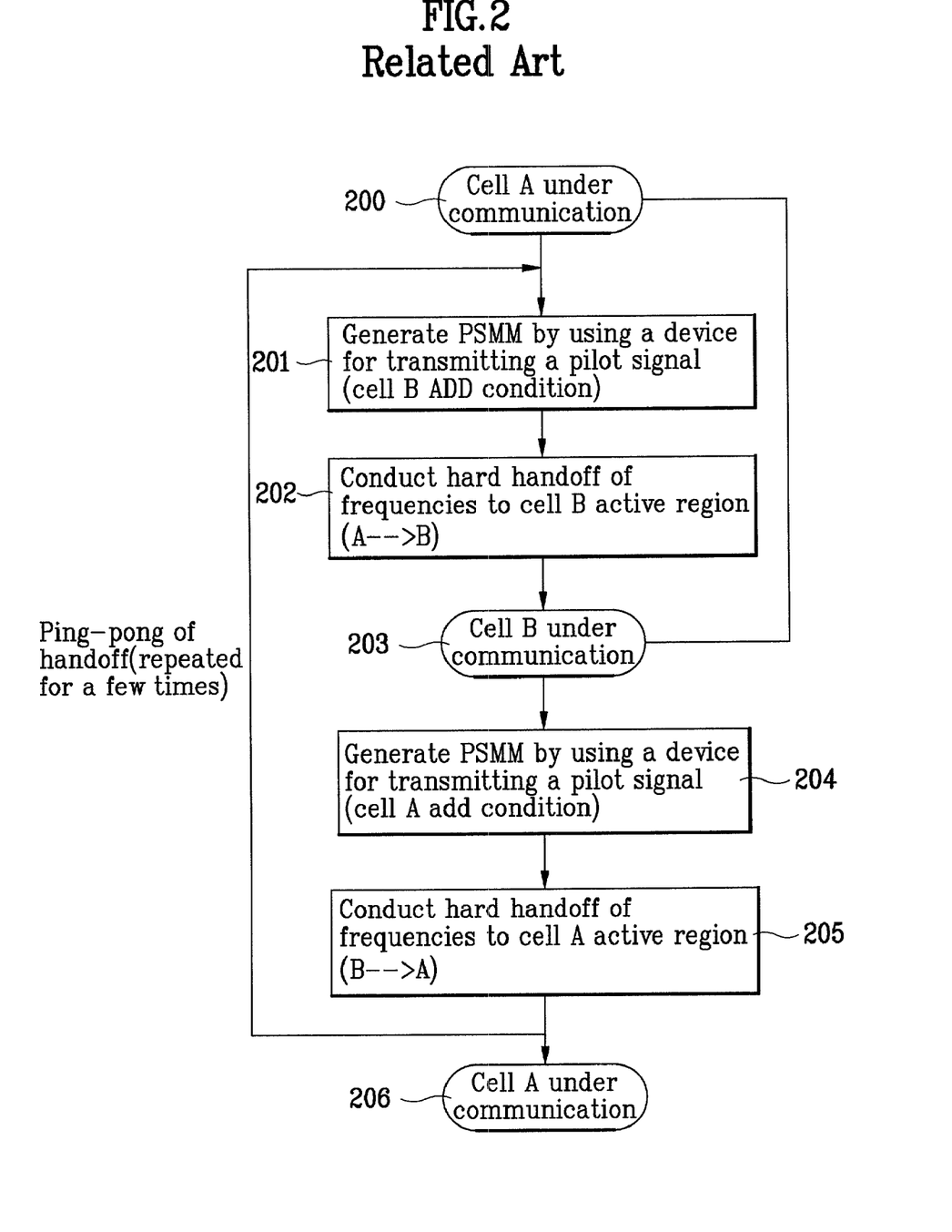
FIG. 2 is a flow chart illustrating a related art method for making a handoff between CDMA mobile communication systems.

FIG. 2 illustrates a related art method for performing a handoff between CDMA mobile communication systems. Referring to FIG. 2, a mobile station initially has a communication channel established through a base station of cell 'A' (step 200). When the mobile station moves from cell 'A' to cell 'B', if a strength of a pilot signal transmitted from a pilot beacon of cell 'B' and having a frequency identical to a frequency of the cell 'A' pilot signal meets a handoff threshold condition, the mobile station transmits a Pilot Strength Measurement Message (PSMM) to the base station of cell 'A' (step 201). Then, the cell 'A' base station analyzes the PSMM, and conducts an inter-frequency hard handoff to the cell 'B' base station (step 202). When the cell 'A' base station completes the inter-frequency hard handoff to the cell 'B' base station, the initial communication channel established between the mobile station and the cell 'A' base station is switched from the cell 'A' base station to the cell 'B' base station (step 203).

However, in a boundary area between cell 'A' and cell 'B', if the strength of the pilot signal used for processing a handoff varies continuously, the communication channel is switched from cell 'B' back to cell 'A'. To do this, the mobile station transmits the PSMM to the cell 'B' base station when the strength of the pilot signal having a frequency identical to that of cell 'B' transmitted from the cell 'A' pilot beacon area meets the handoff threshold value condition (Step 204). Then, the inter-frequency hard handoff is made from cell 'B' to cell 'A' (step 205). Consequently, the communication channel established between the mobile station and the cell 'B' base station is set up between the mobile station and the base station of the cell 'A' (step 203).

The related art method for performing a hard handoff between different CDMA mobile communication systems thus has various problems. For example, it causes the ping-pong of handoff in which calls are repeatedly connected and cut-off. This is due to the ceaseless variation of the signal strengths of frequencies of the cells in the boundary area in handoff process, which causes signal cut off in the boundary area of systems. The frequent occurrence of the ping-pong effect during the handoff puts a heavy load on the PSMM and thus deteriorates communication quality. Additionally, it requires an additional device to process handoff of a data call owing to difficulty to find a control path or a bearer path between the systems.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a method and system for performing a handoff between different CDMA systems or between 2G~3G systems.

Another object of the present invention is to provide a system and method for enhancing call set up and communication quality.

To achieve at least these objects, in whole or in parts, there is provided a method for making handoff in a mobile communication network having a cell 'A', a cell 'B' and a cell 'G' between the cell 'A' and the cell 'B' wherein the cell 'A' and an α sector of the cell 'G' have the same frequency and signal strengths overlapped with each other and the cell 'B' and a β sector of the cell 'G' have the same frequency and signal strengths overlapped with each other, including the steps of (1) making a first handoff from the cell 'A' to the α sector of the cell 'G' if a strength of a signal from the cell 'G' is higher than a threshold value, (2) a base station making an inter-sector hard handoff from the α sector of the cell 'G' to the β sector of the cell 'G' if a signal of the cell 'A' meets a drop threshold value, and (3) making a second handoff from the β sector of the cell 'G' to the cell 'B' if a strength of a signal of the cell 'B' is higher than a threshold value.

Step (1) preferably includes the steps of making an ADD handoff in which the α sector of the cell 'G' is added to the cell 'A' if the strength of the signal of the α sector of the cell 'G' is higher than the threshold value, and making a drop handoff in which the cell 'A' is dropped if the strength of the signal of the cell 'A' is a drop threshold value.

Step (2) preferably includes the step of switching from the α sector of the cell 'G' to the β sector of the cell 'G' and changing the frequency upon completion of the step (1). Step (3) preferably includes the steps of making an ADD handoff in which the β sector of the cell 'G' is added to the cell 'B' if the strength of the signal of the cell 'B' is higher than the threshold value, and making a drop handoff in which the β of the cell 'G' is dropped if the strength of the signal of the β sector of the cell 'G' is a drop threshold value.

In order to achieve at least the above objects in whole or in parts, there is further provided a system for making CDMA mobile communication system handoff, including a first mobile communication system of a CDMA system, a second mobile communication system of a CDMA system different from the CDMA system of the first mobile communication system, and a gateway station having a first sector inclusive of a frequency group of the first mobile communication system and a second sector inclusive of a frequency group of the second mobile communication system, for controlling and managing handoff between the first mobile communication system and the second mobile communication system and making the first mobile communication system and the second mobile communication system interchangeable.

The gateway station preferably includes a gateway base station interchangeable with the base stations of the first mobile communication system and the second mobile communication system, and a gateway control station having functions of the first mobile communication system and the second mobile communication system for controlling the gateway base station.

In order to achieve at least the above objects in whole or in parts, there is further provided a method for performing a handoff between different mobile communication networks, including performing a first handoff from a first base station of a first communication network to a first sector of a gateway base station when a pilot signal strength from the gateway base station exceeds a threshold value, performing an inter-sector handoff from the first sector of gateway base station to a second sector of the gateway base station when a pilot signal strength of the first base station meets a drop threshold value, and performing a second handoff from the second sector of the gateway base station to a second base station of a second communication network when a pilot signal strength of the gateway base station exceeds a threshold value.

In order to achieve at least the above objects in whole or in parts, there is further provided method for making handoff in a mobile communication network having a cell 'A', a cell 'B', and a cell 'G' coupled between cell 'A' and cell 'B', including performing a first handoff from cell 'A' to an α sector of cell 'G' if a strength of a signal from cell 'G' is higher than a threshold value, performing an inter-sector hard handoff from the α sector of cell 'G' to the β sector of cell 'G' if a signal of cell 'A' meets a drop threshold value, and performing a second handoff from the β sector of cell 'G' to cell 'B' if a strength of a signal of cell 'B' is higher than a threshold value wherein cell 'A' and the α sector of cell 'G' use a first frequency and signal strengths overlapped with each other and cell 'B' and the β sector of cell 'G' use a second frequency and signal strengths overlapped with each other.

In order to achieve at least the above objects in whole or in parts, there is further provided a system for performing a handoff between CDMA mobile communication systems, including a first mobile communication system, a second mobile communication system different from the first mobile communication system, and a gateway station communicatively having a first sector inclusive of a frequency group of the first mobile communication system and a second sector inclusive of a frequency group of the second mobile communication system, the gateway station configured to control and manage the handoff between the first mobile communication system and the second mobile communication system to make the first mobile communication system and the second mobile communication system interchangeable.

In order to achieve at least the above objects in whole or in parts, there is further provided a gateway for performing a handoff between a first communication system using a first communication standard and a second communication system using a second communication standard, including a gateway base station located between base stations of the first and second communication systems and having first and second sectors of coverage using first and second frequencies, respectively, the gateway base station configured to communicate with a mobile terminal, and a gateway control station communicatively coupled with each of the first and second communication networks and configured to control the gateway base station.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 3:
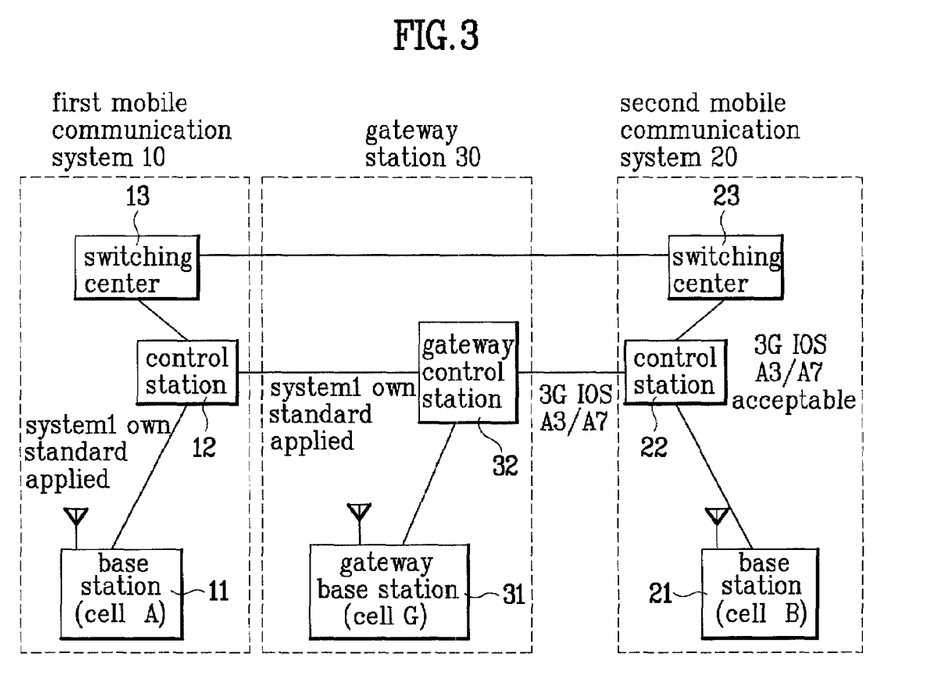
FIG. 3 is a diagram illustrating a mobile communication system in accordance with a preferred embodiment of the present invention.

FIG. 3 illustrates a CDMA mobile communication system having at least two different mobile communication systems in accordance with a preferred embodiment of the present invention. Referring to FIG. 3, the CDMA mobile communication system which can support a handoff in accordance with a preferred embodiment of the present invention preferably includes a first mobile communication system 10 using a first CDMA system standard, and a second mobile communication system 20, using a second CDMA system standard. For this example, the second CDMA system standard is assumed to be a 3G IOS A3/A7 standard. A gateway station 30 is provided to manage and control the first and second mobile communication systems, and accept the first standard of the first mobile communication system and the 3G IOS A3/A7 standard of the second mobile communication system. The gateway station 30 thus makes systems of different standards interchangeable. The gateway station 30 preferably includes a first sector (α sector) for accepting a group of frequencies of the first mobile communication system and a second sector (β sector) for accepting a group of frequencies of the second mobile communication system.

The first mobile communication system 10 preferably includes a base station 11 of a cell 'A' area for receiving and transmitting messages from/to the mobile stations and managing radio resources. The first mobile communication system 10 further includes a control station 12 for controlling the base station 11 of the cell 'A' area and processing the vocoding of a voice packet. A switching center 13 is provided for translating and switching a subscriber number through the control station 12.

The second mobile communication system 20 preferably includes a base station 21 of a cell 'B' area for receiving and transmitting messages from/to the mobile stations and managing radio resources. The second mobile communication system 20 further includes a control station 22 for controlling the base station 21 of the cell 'B' area and processing the vocoding of a voice packet. A switching center 23 is provided for translating and switching a subscriber number through the control station 22.

The gateway station 30 is coupled between the first mobile communication system 10 and the second communication system 20, and includes a gateway base station 32 having a cell 'G' with two sectors (an α sector and a β sector). The gateway base station 32 is thus configured to accept all groups of frequencies from both the base station 11 of cell 'A' of the first mobile communication system 10 and the base station 21 of cell 'B' of the second mobile communication system 20. The gateway station 30 further includes a gateway control station 32 having an ATM backbone with a TIA 3G IOS 4.0 applied thereto coupled to the control station 12 of the first mobile communication system 10 and the control station 22 of the second mobile communication system 20.

The gateway base station 31 conducts a handoff between the first mobile communication system 10 and the second mobile communication system 20. The gateway base station 31 is installed in the cell 'G' area, which overlaps the cell 'A' area of the base station 11 of the first mobile communication system 10 and the cell 'B' area of the base station 21 of the second mobile communication system 20. Cell 'G' uses both the frequencies of the first mobile communication system 10 containing the base station 11 of the cell 'A' area and the second mobile communication system 20 containing the base station 21 of the cell 'B' area. The gateway control station can preferably conduct all CDMA frame processing functions when it is coupled with a digital cellular system, a personal communication system, a radio local loop system, or an IMT-2000 system.

Figure 4:
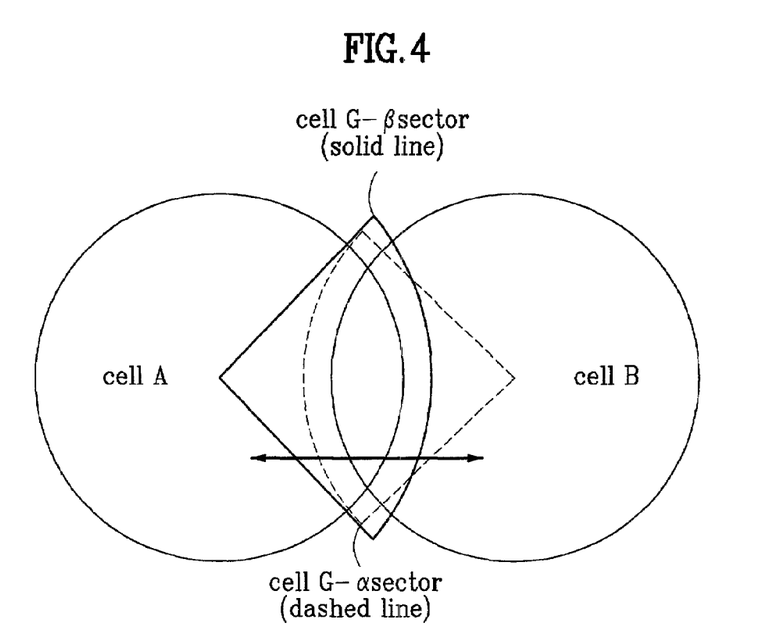
FIG. 4 is a drawing that illustrates a cell system showing an area between cells in the handoff system of FIG. 3.

FIG. 4 illustrates a cell system showing an area between cells in the handoff system of FIG. 3. Referring to FIG. 4, cell 'G' has an α sector and a β sector. The a sector of cell 'G', as marked with a dashed line, has the same frequency as cell 'A' and a signal strength overlapped with cell 'A', and has a strength of a frequency pilot signal matched with a signal strength of cell 'B'. The β sector of cell 'G', as marked with a solid line, has the same frequency as cell 'B' and a signal strength overlapped with cell 'B', and a strength of a frequency pilot signal matched with a signal strength of cell 'A'.

Figure 5:
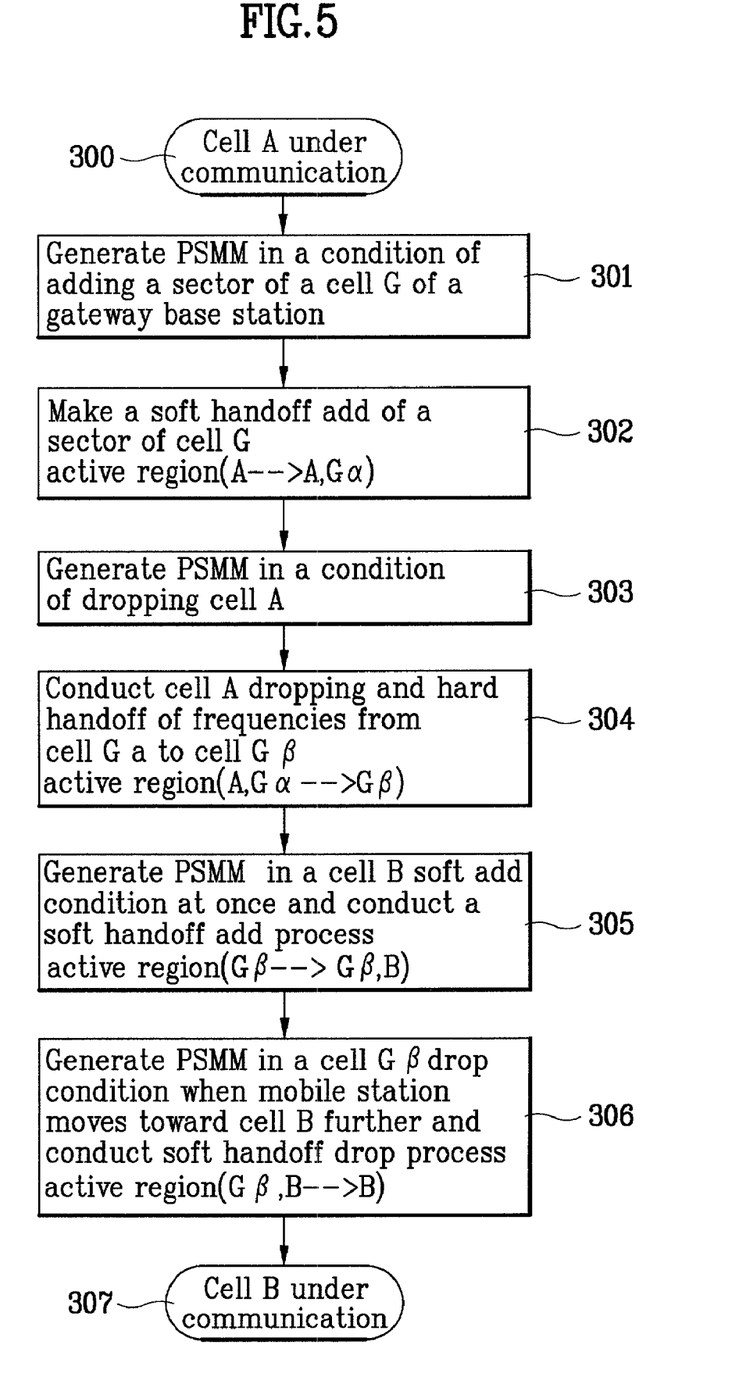
FIG. 5 is a flow chart illustrating an operation sequence of a handoff between CDMA mobile communication system in accordance with the preferred embodiment of the present invention.

Next, referring to FIG. 5, an operation sequence of a handoff between CDMA mobile communication systems in accordance with a preferred embodiment of the present invention is described. As shown in FIG. 5, a mobile station first sets up a call through a base station of cell 'A' (step 30C)). When the mobile station moves toward cell 'B' while a communication channel is set up through the base station of the cell 'A' region, a gateway base station in the cell 'G' region, which is an overlap region of the cell 'A' region and the cell 'B' region, transmits a pilot signal (α sector) to the mobile station. The mobile station then detects a strength of the pilot signal from the α sector of cell 'G' having the frequency as that of cell 'A'. The mobile station transmits a PSMM to the base station of the cell 'A' region if the strength of the α sector pilot signal of cell 'G' from the gateway base station reaches a prescribed threshold value (step 301).

In this instance, all the handoffs between the mobile station and the control station are processed using three standard messages. These messages include the PSMM (Pilot Strength Measurement Message), an Extended Handoff Direction Message (EHDM), and a Handoff Completion Message (HCM). The PSMM is a message that is transmitted to an active base station with which the mobile station is in communication when a pilot signal strength of an adjacent base station having the same frequency reaches a handoff threshold value. The EHDM is a message transmitted from the base station/control station to the mobile station regarding assignment of a Walsh code, a Frame Offset, and a CDMA channel after the base station/control station fixes a method for processing the handoff (soft add/drop, softer add/drop, or hard). This occurs after receiving the PSMM from the mobile station, and information on active set to be corrected. Finally, the HCM is a message transmitted from the mobile station to the base station/control station regarding information processed by the mobile station, such as the set up of a new radio channel, or the cancellation of existing resources, and the like. The HCM also includes changes to the active set information, with reference to the radio resource information and the active set information to be corrected upon reception of the EDHM.

When the strength of the pilot signal from the α sector of cell 'G' reaches a threshold value to be an ADD soft handoff condition, the cell 'A' base station recognizes the threshold value of the pilot signal and conducts a soft handoff. The α sector of cell 'G' is thus added to the active set for the mobile station (step 302). An active region of the soft handoff is the α sector of cell 'G' which is an overlapped portion of cell 'A' and cell 'B' using a frequency identical to that of cell 'A'. At this time, both the gateway base station of cell 'G' and the base station of cell 'A' receive all CDMA frames. The CDMA frames received by the gateway base station of cell 'G' are transferred to the cell 'A' control station and selected. Forward direction CDMA frames are transmitted from the cell 'A' control station to the mobile station through paths of both the cell 'A' base station and the α sector of the cell 'G' region.

After the soft handoff adding the α sector of the cell 'G' region is conducted as the mobile station moves toward the α sector of the cell 'G' region, the strength of the pilot signal of the communication channel set up with the cell 'A' base station becomes weak, and eventually drops below the threshold value. When the pilot signal strength drops below a threshold value, the base station becomes a DROP candidate. The mobile station thus transmits a PSMM to the cell 'A' base station and the cell 'G' gateway base station. The cell 'A' base station and the cell 'G' gateway base station identify the strength of the pilot signal, and the gateway base station drops cell 'A' from the active region in association with the gateway control station (step 303).

After cell 'A' is dropped, the mobile station starts to detect the strength of the signal from the β sector of cell 'G'. The signal from the β sector has a frequency that is identical to the frequency of the cell 'B' region. Thus, if the strength of the pilot signal of the β sector of the cell 'G' is higher than the threshold value, the mobile station transmits the PSMM to the gateway base station, and the gateway base station conducts a hard handoff of frequencies from the α sector of the cell 'G' to the β sector of the cell 'G' (step 304). That is, the base station switches from the α sector of cell 'G' to the β sector of the cell 'G' without any trigger. With the hard handoff, the base station also switches to the frequency of the β sector of the cell 'G'. When the hard handoff of frequencies to the β sector of the cell 'G' is conducted, the communication channel set up between the cell 'A' region and the α sector of the cell 'G' region is immediately cut off. Accordingly, the active region is changed from cell 'A' and the α sector of cell 'G' to cell 'A' and the β sector of the cell 'G' region, overlapped with cell 'B' and using a frequency of the cell 'B' region. In this instance, transcoding and switching center paths of the first mobile communication system of cell 'A' in FIG. 3 are used for the same of the first and second mobile communication systems as they are.

After completing the hard handoff to the β sector of cell 'G' the active region is the β sector of the cell 'G'. At this time, the strength of the pilot signal of cell 'B' is at an ADD condition, indicating a soft handoff threshold. Additionally, the frequency of the β sector of cell 'G' is the same as the frequency of cell 'B'. Accordingly, the mobile station transmits the PSMM, including a strength of the pilot signal received from the cell 'B' base station, to the gateway base station of cell 'G'. This initiates the handoff to cell 'B' (step 305). In this instance, the gateway control station of cell 'G' is interlocked with the control station and the cell 'B' base station. Control right, transcoding, and switching center paths of the first and second communication station systems are switched to the second mobile communication system shown in FIG. 3. The active region of the soft handoff is changed from the β sector of the cell 'G' region to the β sector of the cell 'G' region and the cell 'B' region.

After the soft handoff to the β sector of cell 'G' and cell 'B' is completed, if the mobile station moves further toward cell 'B', the strength of the pilot signal from the gateway base station reaches a drop condition, the mobile station transmits a PSMM to the gateway base station of cell 'G'. The gateway base station thus drops the β sector of cell 'G' upon receiving the PSMM (step 306), leaving cell 'B' as the remaining active region. As a result of dropping the β sector of cell 'G', the mobile station completes the handoff from cell 'A' to cell 'B', which are different systems using different frequencies, to make communication through the base station of the cell 'B' region (step 307).

The method and system for performing a handoff between different CDMA systems or between 2G~3G systems has many advantages. For example, the first soft handoff, the hard handoff, and the second soft handoff are made in succession. This reduces the possibility of failure of a forward or backward communication path set up during the hard handoff. It also eliminates the ping-pong effect in which call connection/cut off are repeated, thus reducing the problem of call cut off during the handoff.

Furthermore, the system of the gateway accepts all mobile communication systems and provides interchangeability between the first and the second mobile communication systems. The matching of the first and the second mobile communication systems through the gateway control station in the gateway station also permits an extended application to data call handoffs by means of all system interlocking without requiring any separate device.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for performing a handoff between different mobile communication networks, comprising:
    performing a first handoff from a cell region of a first base station of a first communication network to a first sector of a gateway base station when a pilot signal strength from the gateway base station exceeds a threshold value, the first handoff being performed while maintaining a frequency of the first base station;
    performing an inter-sector hard handoff from the first sector of the gateway base station to a second sector of the gateway base station when a pilot signal strength of the first base station meets a drop threshold value, the hard handoff changing the frequency of the first base station to a frequency of a second base station different from the frequency of the first base station; and
    performing a second handoff from the second sector of the gateway base station to a cell region of the second base station of a second communication network when a pilot signal strength of the second base station exceeds a threshold value, the second handoff being performed while maintaining the frequency of the second base station, wherein each of the first and second sectors of the gateway base station comprise an overlap area of the first and second base stations.

2. The method of claim 1, wherein the first and second handoffs are one of a soft handoff or a softer handoff.

3. The method of claim 1, wherein the first sector of the gateway base station operates at the frequency of the first base station and wherein the second sector of the gateway base station operates at the frequency of the second base station.

4. The method of claim 1, wherein the gateway base station comprises a gateway control station that is communicatively coupled to a first control station of the first communication network and a second control station of the second communication network.

5. The method of claim 1, wherein a communication standard of the first communication network is different than a communication standard of the second network.

6. The method of claim 5, wherein the communication standard of the first communication network is CDMA 2G, and wherein the communication standard of the second communication network is CDMA 3G.

7. The method of claim 1, wherein performing the first handoff comprises:
    performing an ADD handoff to receive a signal from the first sector of the gateway base station along with a signal from the first base station if the strength of the signal of the first sector exceeds the threshold value; and
    performing a drop handoff to release the signal from the first base station if the strength of the signal of the first base station falls below the drop threshold value.

8. The method of claim 1, wherein performing the inter-sector hard handoff comprises switching from the first sector of the gateway base station to the second sector of the gateway base station, and changing a frequency of the first sector equal to the frequency of the first base station to a frequency of the second sector equal to the frequency of the second base station after performing the first handoff.

9. The method of claim 1, wherein performing the second handoff comprises:
    performing an ADD handoff to receive a signal from the second sector of the gateway base station along with a signal from the second base station if the strength of the signal of the second base station exceeds the threshold value; and
    performing a drop handoff to release the signal from the second sector if the strength of the signal of the second sector falls below the drop threshold value.

10. The method of claim 1, wherein the first and second sectors of the gateway base station overlap one another.

11. The method of claim 1, wherein the cell regions of the first and second base stations overlap one another.

12. A method for making handoff in a mobile communication network having a cell 'A', a cell 'B', and a cell 'G' coupled between cell 'A' and cell 'B', comprising:
    performing a first handoff from cell 'A' to an α sector of cell 'G' if a strength of a signal from cell 'G' is higher than a threshold value;
    performing an inter-sector hard handoff from the α sector of cell 'G' to the β sector of cell 'G' if a signal of cell 'A' meets a drop threshold value; and
    performing a second handoff from the β sector of cell 'G' to cell 'B' if a strength of a signal of cell 'B' is higher than a threshold value wherein cell 'A' and the α sector of cell 'G' use a first frequency and signal strengths overlapped with each other and cell 'B' and the β sector of cell 'G' use a second frequency and signal strengths overlapped with each other, wherein a first base station controls cell A and a second base station controls cell B and wherein each of the α and β sectors comprise an overlap area of the first and second base stations.

13. The method of claim 12, wherein performing the first handoff comprises:
    making an ADD handoff in which the α sector of cell 'G' is added to cell 'A' if the strength of the signal of the α sector of cell 'G' is higher than the threshold value; and
    making a drop handoff in which cell 'A' is dropped if the strength of the signal of cell 'A' drops below the drop threshold value.

14. The method of claim 12, wherein performing the inter-sector hard handoff comprises switching from the α sector of cell 'G' to the β sector of cell 'G' and changing from the first frequency to the second frequency upon performing the inter-sector hard handoff.

15. The method of claim 12, wherein performing the second handoff comprises:
    making an ADD handoff in which the β sector of cell 'G' is added to cell 'B' if the strength of the signal of cell 'B' is higher than the threshold value; and
    making a drop handoff in which the β of cell 'G' is dropped if the strength of the signal of the β sector of cell 'G' drops below the drop threshold value.

16. The method of claim 12, wherein a communication standard of cell 'A' is different than a communication standard of cell 'B.'

17. The method of claim 16, wherein the communication standard of the first communication network is CDMA 2G, and wherein the communication standard of the second communication network is CDMA 3G.

18. The method of claim 12, wherein the β sector of cell 'G' overlaps the α sector of cell 'G' overlap.

19. The method of claim 12, wherein the cells 'A' and 'B' overlap one another.

20. A system for performing a handoff between CDMA mobile communication systems, comprising:

a first mobile communication system having a first communication standard;

a second mobile communication system different from the first mobile communication system having a second communication standard; and a gateway station in an overlap region of the first and second communication system having a first sector inclusive of a frequency group of the first mobile communication system and a second sector inclusive of a frequency group of the second mobile communication system, the gateway station to control and manage a hard handoff from a first frquency of the first mobile communication system to a second frequency of the second mobile communication system, wherein at least one cell of the first communication system and at least one cell of the second communication system overlap one another in said overlap region at an area where the first and second sectors overlap.

21. The system of claim 20, wherein the gateway station comprises:

a gateway base station to communicate with base stations of the first mobile communication system and the second mobile communication system, and a gateway control station having functions and characteristics of the first mobile communication system and the second mobile communication system for controlling the gateway base station.

22. The system of claim 20, wherein the communication standard of the first mobile communication system is CDMA 2G, and wherein the communication standard of the second mobile communication system is CDMA 3G.

23. The system of claim 20, wherein the first and second sectors overlap one another.

24. A gateway for performing a handoff between a first communication system using a first communication standard and a second communication system using a second communication standard, comprising:

a gateway base station located in an overlap region between base stations of the first and second communication systems and having first and second sectors of coverage using first and second frequencies, respectively, and the gateway base station to communicate with a mobile terminal; and a gateway control station communicatively coupled with each of the first and second communication networks and the gateway control station to control the gateway base station, wherein a first communication network performs first soft handoff of a call to the first sector of the gateway base station using the first frequency, the gateway base station performs an inter-frequency hard handoff of the call between the first and second sectors of the gateway base station from the first frequency to the second frequency, and wherein the gateway base station performs a second soft handoff of the call to the second communication network using the second frequency, wherein the gateway base station prevents a ping-pong effect during the handoff of the call from the first communication network to the second communication network.

25. The gateway of claim 24, wherein the frequency used by the first sector is a frequency used by the first communication system, and wherein the frequency used by the second sector is a frequency used by the second communication system.

26. The gateway of claim 25, wherein the gateway base station acquires a mobile terminal communicating on the first communication network using the first frequency by the first soft handoff, performs the inter-frequency hard handoff from the first sector using the first frequency to the second sector using the second frequency, and passes the mobile terminal to the second communication network using the second frequency by performing the second soft handoff.

27. The gateway of claim 21, wherein the first and second sectors overlap one another.

* * * * *